United States Patent [19]

Mizuhara et al.

[11] Patent Number: 5,301,861
[45] Date of Patent: Apr. 12, 1994

[54] GOLD-NICKEL-VANADIUM BRAZIN MATERIALS

[75] Inventors: Howard Mizuhara, Hillsborough; Eugene Huebel, Union City, both of Calif.

[73] Assignee: The Morgan Crucible Company, PLC, United Kingdom

[21] Appl. No.: 100,723

[22] Filed: Aug. 2, 1993

Related U.S. Application Data

[62] Division of Ser. No. 924,848, Aug. 4, 1992, Pat. No. 5,273,832.

[51] Int. Cl.$^5$ .............................................. B23K 35/30
[52] U.S. Cl. .................................. 228/121; 228/122.1; 228/124.5; 228/262.9
[58] Field of Search .............. 228/262.9, 121.1, 122.1, 228/124.5; 429/507, 512

[56] References Cited

U.S. PATENT DOCUMENTS

| | | | |
|---|---|---|---|
| 3,022,162 | 2/1962 | Donnelly et al. | 420/512 |
| 3,846,125 | 11/1974 | Stevens | 420/512 |
| 4,447,391 | 5/1984 | Mizuhara | 420/456 |
| 4,678,636 | 7/1987 | Mizuhara | 420/456 |
| 4,820,487 | 4/1989 | Antoniazzi | 420/512 |
| 4,938,922 | 7/1990 | Mizuhara | 420/508 |

FOREIGN PATENT DOCUMENTS 63-317276 12/1988 Japan .................................. 420/512

*Primary Examiner*—Kenneth J. Ramsey
*Attorney, Agent, or Firm*—McCubbrey, Bartels & Ward

[57] ABSTRACT

A ductile brazing material containing gold, nickel, vanadium and, optionally chromium or molybdenum is disclosed for directly bonding ceramic to ceramic or ceramic to metal over an optimum temperature range.

5 Claims, No Drawings

GOLD-NICKEL-VANADIUM BRAZIN MATERIALS

This is a division of application Ser. No. 07/924,848, filed Aug. 4, 1992 now U.S. Pat. No. 5,273,832.

FIELD OF THE INVENTION

This invention relates to brazing materials. More particularly, the invention relates to brazing alloys and pastes containing gold, nickel, vanadium and, optionally, chromium and/or molybdenum.

BACKGROUND OF THE INVENTION

Ceramic materials exhibiting such favorable properties as high hardness, wear and corrosion resistance, electrical resistivity, and low friction, have traditionally been used at relatively low temperatures, or under low tensile stress at high temperatures. Recently, however, major efforts have been made to use ceramics in structural applications that include a combination of conditions including significant tensile or flexure stresses, a range of temperatures, and corrosion environments. The ceramics that have being developed to meet these needs are generally referred to as technical, advanced or high performance ceramics. Materials of this type are generally produced by state-of-the-art technology and are therefore also known as high technology ceramics.

It is well recognized in the ceramics industry that one of the key technologies that will enhance the use of high technology ceramics is the ability to reliably (i) join simple shape components to form complex assemblies, (ii) join unit lengths of materials to form large systems, and (III) join high technology ceramic components to metals.

In an effort to join such ceramics, active metal brazing has been developed resulting in simplified processing while preserving or enhancing bond integrity. Active metal brazing is a technique where wetting and bonding of the base braze material is improved due to the presence of a small amount of active metal such as titanium or zirconium.

It is, however, well known in the art that the thermal expansion mismatch between many materials, particularly a metal and ceramic member, requires the use of a ductile base braze material. Thus, brittle brazing materials, such as the gold-based alloys disclosed in U.S. Pat. No. 4,447,391 (containing boron), have limited usefulness.

However, the gold-nickel-titanium brazing alloys disclosed in U.S. Pat. No. 4,938,922 are illustrative of ductile brazing materials. In order to achieve the desired ductility the titanium content of these alloys is generally maintained at very low levels, i.e. 0.1% to 2.0% weight percent. The disclosed gold-nickel-titanium alloys may be employed in a single step process which produces a highly ductile brazed joint with excellent oxidation resistance at 650° C. and no visible reaction to acid and alkali treatment. The alloy has been successfully employed to braze silicon nitride ceramic to Incolloy 909 alloy for use in internal combustion engines, and is currently produced and sold by The Morgan Crucible Company plc, Wesgo Division, under the trademark SNW-3000.

The gold-nickel-titanium alloys of the noted patent will exhibit sufficient wetting to an alumina ceramic, but, over a very narrow temperature range of about 20° C. Exceeding this temperature results in dewetting—that is, the molten alloy beads up leaving bare ceramic where molten alloy formerly coated the surface.

It has, however, been found that if vanadium is substituted as the active metal in the brazing material, such as the titanium containing alloys disclosed in U.S. Pat. No. 4,938,922, higher quantities of vanadium may be employed while still maintaining the desired ductility. The increased quantity of active metal, in this case vanadium, will also significantly enhance the wetting characteristics of the brazing material over a broader range of temperatures.

Illustrative are the gold-based alloys disclosed in U.S. Pat. No. 4,606,978, containing gold, nickel, vanadium and, optionally molybdenum to prevent high temperature creep. The gold content for the disclosed alloys is generally maintained at approximately 25-85% by weight. The molybdenum content for these alloys is, however, maintained at high levels, i.e. 6-40% by weight.

What has, however, recently been found is that the addition of very low levels of molybdenum to gold-nickel-vanadium brazing materials, such as those disclosed in U.S. Pat. No. 4,606,978, will significantly enhance the ductility of the brazing material. The brazing material will therefore exhibit a lower yield strength. The lower yield strength results in lower residual stress in a brazed joint since the plastic deformation of the brazing material accommodates the thermal expansion mismatch between articles being brazed. The brazing material will also be easier to mechanically reduce/deform (i.e., rolling processes), minimizing any edge cracking which is generally associated therewith.

It is therefore an object of the present invention to provide a brazing material that can be directly brazed to a ceramic surface over a broader range of temperature and yield a highly ductile, oxidation and corrosion resistant brazed joint.

SUMMARY OF THE INVENTION

The improved brazing material of the present invention substantially reduces or eliminates the disadvantages and shortcomings associated with prior art materials. The invention specifically discloses brazing alloys and pastes containing gold, nickel, vanadium and, optionally, chromium and/or molybdenum.

The gold-nickel-vanadium brazing materials of the present invention generally have liquidus temperatures in the range of from about 960° C. to about 1,100° C. The brazing materials are highly ductile and, after brazing, are relatively free of hard dispersed phases.

DETAILS OF PREFERRED EMBODIMENTS

The gold-nickel-vanadium brazing materials of the present invention comprise alloys and pastes. The brazing materials generally have a composition substantially comprised of, in weight percent: 85-98% gold, 0.5-20% nickel, 0.5-6% vanadium, 0-4% molybdenum, 0-5% chromium. Preferably, the brazing material has a composition substantially comprised of, in weight percent: 85-98% gold, 0.5-20% nickel, 0.5-6% vanadium, 0.25-4% molybdenum, 0.3-5% chromium.

It has been found that the higher gold content brazing materials of the present invention produce a highly ductile material which is particularly useful for brazing ceramics. It has also been found that when vanadium is used as a reactive element in a gold-nickel brazing material, the resultant material is more ductile and, hence, exhibits a lower yield strength than gold-nickel-titanium brazing materials. The gold-nickel-vanadium brazing material also exhibits excellent wetting to ceramics and does not dewet when exposed to a wider brazing temperature range as compared to a gold-nickel-titanium brazing materials.

The term "wetting", as used herein, generally describes the liquid distribution on solids. Specifically, when the brazing material is melted on the ceramic or metal substrate the material exhibits sufficient adherence to form a strong bond to the substrate. The term "dewetting" generally describes an inadequate liquid distribution on the substrate—that is, upon increasing the temperature by 10° to 20° C. the brazing material will tend to ball up leaving a bare spot where the brazing material originally bonded.

It has also been found that the amount of vanadium which may be added to the basic gold-nickel brazing material and still maintain optimum ductility, is much greater than other reactive metals such as titanium and zirconium. According to the invention, the amount of vanadium may range from about 0.5% to 6% by weight and still maintain acceptable ductility. Since the ceramic wettability of the ductile gold-nickel-vanadium system is generally about 1.5-3.5% by weight vanadium, the amount of vanadium is generally maintained at about 2%-3% by weight. Thus, in the preferred embodiment, the brazing material composition substantially comprises, in weight percent: 96.5% gold, 1.5% nickel, 2% vanadium.

According to the invention, chromium may additionally be added to improve corrosion and oxidation resistance. It has been found that the addition of chromium to the gold-nickel-vanadium brazing materials of the invention also results in an increase in ductility. Further, a low concentration of chromium (i.e., 0.5-1.5%) permits lowering of the vanadium content without affecting the wettability of the brazing material to ceramic surfaces.

The amount of chromium is generally maintained from about 0.3% by weight to about 5% by weight, preferably 1-3%, to achieve a ductile material. Accordingly, in a further embodiment of the invention, the gold-nickel-vanadium brazing material, with the addition of chromium, substantially comprises, in weight percent: 94% gold, 2% nickel, 3% vanadium, 1% chromium.

As previously stated, it has additionally been found that the addition of very low levels of molybdenum to gold-nickel-vanadium brazing materials will significantly enhance the ductility of the base material. The brazing material (i.e., alloy or paste) will, therefore, exhibit a low yield strength, minimizing the residual stress due to the thermal expansion of mismatched systems.

Therefore, in yet further embodiments of the invention, molybdenum may be added to the gold-nickel-vanadium brazing materials, with or without chromium. The amount of molybdenum would generally be added in an amount from about 0.25% by weight to about 4% by weight, preferably 0.5-1% by weight.

The controls and examples which follow illustrate the gold-nickel-vanadium brazing alloys of the present invention. The examples are for illustrative purposes only and are not meant to limit the scope of the claims in any way.

NOTE: ALL ALLOY COMPOSITIONS ARE IN WEIGHT PERCENT.

EXAMPLE 1

An alloy of 94% Au, 2% Ni, 1% Cr, 3% V (Alloy #6) was plasma melted (via a tungsten electrode) in a water-cooled copper crucible under argon gas. A 7 gram melted button of the alloy was then hot rolled down to about 75 mil thickness. The alloy was substantially rolled down to 2 mil without intermediate anneal.

A 2 mil foil was then placed between a 1¼"×1¼"×0.10 alumina plate and a ½"×½"×0.040 molybdenum sheet, and successfully vacuum brazed at 1,120° C. under $10^{-5}$ Torr vacuum resulting in a brazed joint with a full fillet. The low peel strength of the joint did, however, indicate the presence of a high residual stress.

EXAMPLE 2

An alloy of 96.5% gold, 1.5% nickel, 2% vanadium (Alloy No. 1) was prepared as described in Example 1 and rolled down to a 2 mil foil. Three 2 mil foils were then placed on an alumina substrate and brazed under $10^{-5}$ Torr vacuum at 1,050° C., 1,075° C. and 1,100° C., respectively. It is possible to braze below the liquidus temperature (i.e., 1,050° C.) if a wide temperature range exists between the solidus and liquidus temperature. The alloy exhibited no dewetting and melted with a bright gold color.

The alloy was also brazed to a molybdenum test plate, as described in Example 1, and simultaneously heated to the above temperatures. The brazed joint exhibited a high peel strength, indicating a low residual joint stress.

The alloy compositions investigated and falling within the scope of this invention are provided in Table I.

TABLE I

| Alloy No. | ELEMENTS (% by wt.) | | | | Solidus °C. | Liquidus °C. | KNH |
|---|---|---|---|---|---|---|---|
| | Au | Ni | V | Cr | | | |
| 1 | 96.50 | 1.50 | 2.00 | | 1026 | 1068 | |
| 2 | 96.00 | 1.00 | 3.00 | | 1060 | 1092 | |
| 3 | 94.00 | 2.00 | 4.00 | | 1058 | 1091 | |
| 4 | 96.25 | 1.50 | 1.50 | 0.75 | 1022 | 1065 | |
| 5 | 94.00 | 2.00 | 2.00 | 2.00 | 1040 | 1092 | |
| 6 | 94.00 | 2.00 | 3.00 | 1.00 | 1041 | 1096 | |

Alloy Nos. 1-6 exhibited excellent wettability to a variety of materials, including alumina ceramic. The brazed joints also exhibited a high metallic finish and a fine grain structure.

Without departing from the spirit and scope of this invention, one of ordinary skill can make various changes and modifications to the invention to adapt it to various usages and conditions. As such, these changes and modifications are properly, equitably, and intended to be, within the full range of equivalents of the following claims.

What is claimed is:

1. A method of forming a brazed joint between a first material selected from the group consisting of metals, ceramics and mixtures thereof and a second material selected from the group consisting of metals, ceramics and mixtures thereof comprising the steps of disposing between said first material and said second material a brazing material having a liquidus temperature of approximately 960° C. to 1,100° C. and a composition consisting essentially of, in weight percent: 92-98% gold, 0.5-20% nickel, 0.5-6% vanadium, 0-4% molybdenum, 0–5% chromium and heating said first material, said second material and said brazing material to a temperature sufficient to melt said brazing material and form a braze between said first material and said second material.

2. The method of claim 1 wherein said brazing material composition consists essentially of, in weight percent: 96.5% gold, 1.5% nickel, 2% vanadium.

3. The method of claim 1 wherein said brazing material composition consists essentially of, in weight percent: 94% gold, 2% nickel, 1% chromium, 3% vanadium.

4. The method of claim 1 wherein said brazing material comprises a paste.

5. The method of claim 1 wherein said brazing material comprises an alloy.

* * * * *